United States Patent [19]

Jo

[11] Patent Number: 5,762,886
[45] Date of Patent: Jun. 9, 1998

[54] OZONE GENERATOR

[75] Inventor: Soo Hwan Jo, Seoul, Rep. of Korea

[73] Assignee: DongWoo Kiyoun, Inc., Kyunggi-do, Rep. of Korea

[21] Appl. No.: 528,419

[22] Filed: Sep. 14, 1995

[30]   Foreign Application Priority Data

Sep. 14, 1994 [KR]   Rep. of Korea ............... 1994-23246
Jun. 20, 1995 [KR]   Rep. of Korea ............... 1995-16491

[51] Int. Cl.$^6$ ............................................. B01J 19/08
[52] U.S. Cl. ............................................. 422/186.18
[58] Field of Search ................... 422/186.07, 186.18; 204/176

[56]         References Cited

U.S. PATENT DOCUMENTS

| | | | |
|---|---|---|---|
| 4,693,870 | 9/1987 | Gloor et al. | 422/186.19 |
| 4,986,968 | 1/1991 | Hirth et al. | 422/186.19 |
| 5,364,600 | 11/1994 | Stiehl et al. | 422/186.07 |
| 5,573,733 | 11/1996 | Salama | 422/186.18 |

FOREIGN PATENT DOCUMENTS

WO 92/14677   9/1992   WIPO .

*Primary Examiner*—Charles T. Jordan
*Assistant Examiner*—John R. Hardee
*Attorney, Agent, or Firm*—Bell, Boyd & Lloyd

[57]         ABSTRACT

This invention relates to an ozone generator for deodorizing and sterilizing without doing harm to a human body, and being applied to general home appliances, includes a discharger for discharging using high voltage generated from a high-voltage generating portion and an ozone generator for generating ozone by secondary-discharging with a medium of metal inside of the discharger. Thus, ozone can be generated in a place of high temperature, humidity and much dust and at a lower cost, and since a glass tube, a glass bar and a ceramic stick are employed, product cost is reduced.

5 Claims, 4 Drawing Sheets

OZONE GENERATOR

FIELD OF THE INVENTION

The present invention relates to an ozone generator, and more particularly, to an ozone generator which can perform deodorizing and sterilizing with no harm to a human body, and also, can function at a high percentage of humidity.

BACKROUND OF THE INVENTION

A conventional ozone generator adopts a ceramic discharge method, and of which structure is shown in FIGS. 1. and 2.

First, FIG. 1 is a view illustrating a structure of a conventional ozone generator utilizing a ceramic plate and tungsten (W). As shown in the drawing, the generator comprises a power unit 1 for supplying power, an, oscillator 2 for generating oscillation signals by being oscillated by power supplied from power unit 1, a high-voltage generator 3 for generating high voltage by boosting voltage supplied from power unit 1, and an ozone generator 4 for generating ozone by utilizing the high voltage generated from high-voltage generator 3, the generator being provided with a ceramic plate 4a, of which both sides are coated with alumina and sintered metal electrode 4b of W is coated thereon.

In the operation of the ozone generator utilizing W having the above structure, power unit 1 supplies voltage required for the high-voltage generation, and with the power supplied from power unit 1, oscillator 2 oscillates and generates an oscillation frequency. High-voltage generator 3 generates high-voltage of about 3 KV or more with the voltage supplied from power unit 1 and applies the generated high-voltage to ozone generator 4. Accordingly, ozone generator 4 generates ozone by discharging electricity through sintered metal electrodes 4b of W which are formed on both sides of ceramic plate 4a.

Meanwhile, FIG. 2 is a view illustrating a structure of an ozone generator utilizing the conventional ceramic plate and common metal kinds (platinum). This drawing shows, a structure of another ozone generator utilizing W, consisting of a power unit 1 for supplying power, an oscillator 2 for generating oscillation signals by being oscillated by power supplied from power unit 1, and a high-voltage generator 3 for generating high voltage by boosting voltage supplied from power unit 1, which are the same as those of the ozone generator as shown in FIG. 1. However, both sides of a ceramic plate 4a in an ozone generator 4 are coated with electrodes 4c of platinum (Pl) instead of W.

In the operation of the ozone generator utilizing common metal kinds having such a structure, power unit 1 supplies voltage required for the high-voltage generation, and with the power supplied from power unit 1, oscillator 2 oscillates and generates an oscillation frequency. High-voltage generator 3 generates high voltage of about 3 KV or more with the voltage supplied from power unit 1 and applies the generated high-voltage to ozone generator 4. Accordingly, ozone generator 4 generates ozone by discharging electricity through electrodes 4c which are formed on the both sides of ceramic plate 4a.

However, since the conventional ozone generator employs the ceramic plate and electrodes of W or Pl for the generation of ozone, it has been a problem that product cost rises, leading to the rise of the total costs. Also, due to such a high product cost, it has not been available for wide applications to general home appliances such as a refrigerator, air conditioner, and so forth. Further, to operate the above generator under inferior conditions of high humidity and temperature and in a dusty place, has been impossible.

SUMMARY OF THE INVENTION

To solve the above problems, it is an object of the present invention to provide an ozone generator which can perform deodorizing and sterilizing with no harm to a human body, and also, can be applied to general home appliances.

Accordingly, to achieve the above object, there is provided an ozone generator comprising: discharge means for discharging by using high voltage generated from a high-voltage generating portion; and ozone-generating means for generating ozone by secondary-discharging with a medium of metal inside of the discharge means.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
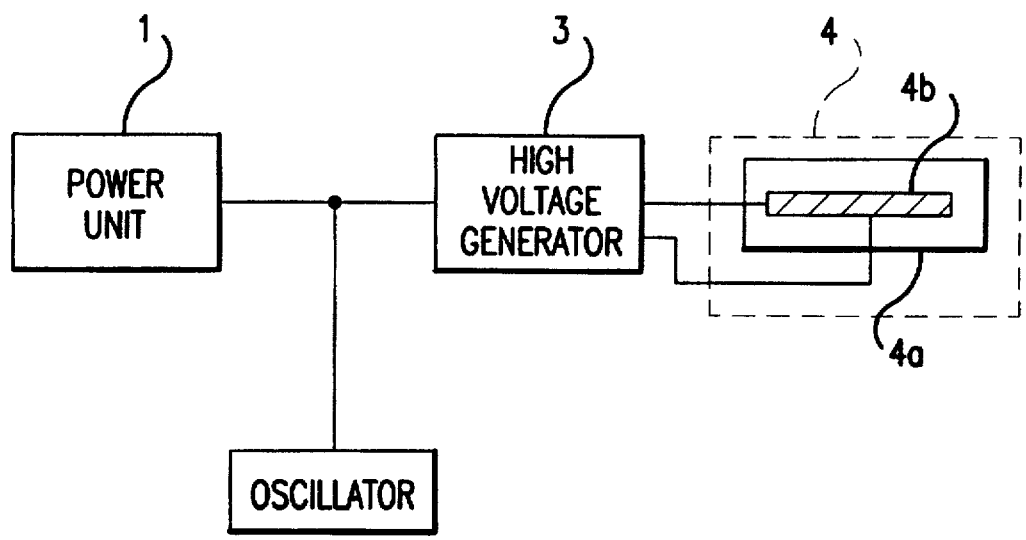
FIG. 1 is a schematic block diagram illustrating a structure of a conventional ozone generator utilizing a ceramic plate and tungsten (W)
Figure 2:
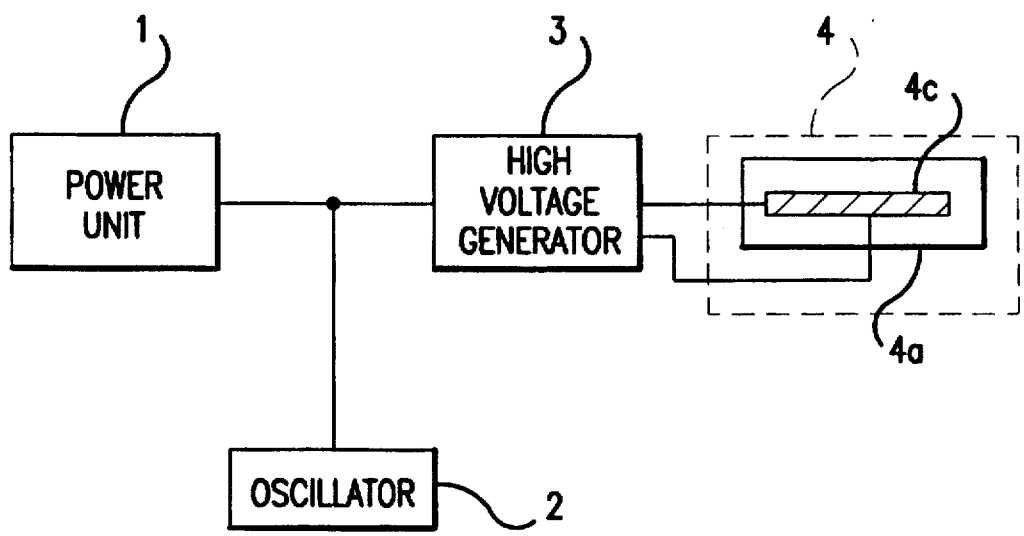
FIG. 2 is a schematic block diagram illustrating a structure of a conventional ozone generator utilizing a ceramic piate and common metal kinds (platinum)
Figure 3A:
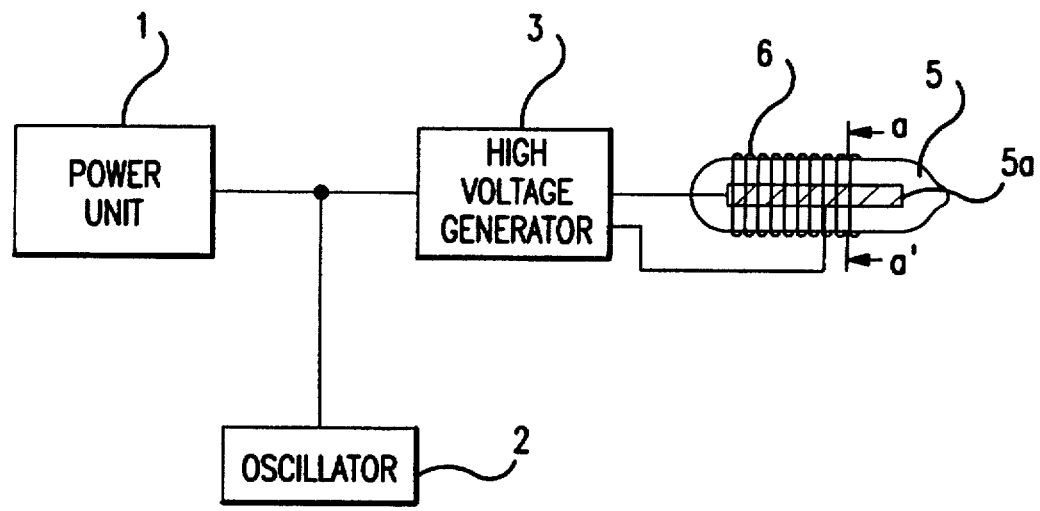
FIG. 3(a) is a schematic block diagram illustrating a first embodiment of an ozone generator according to the present invention.
Figure 3B:
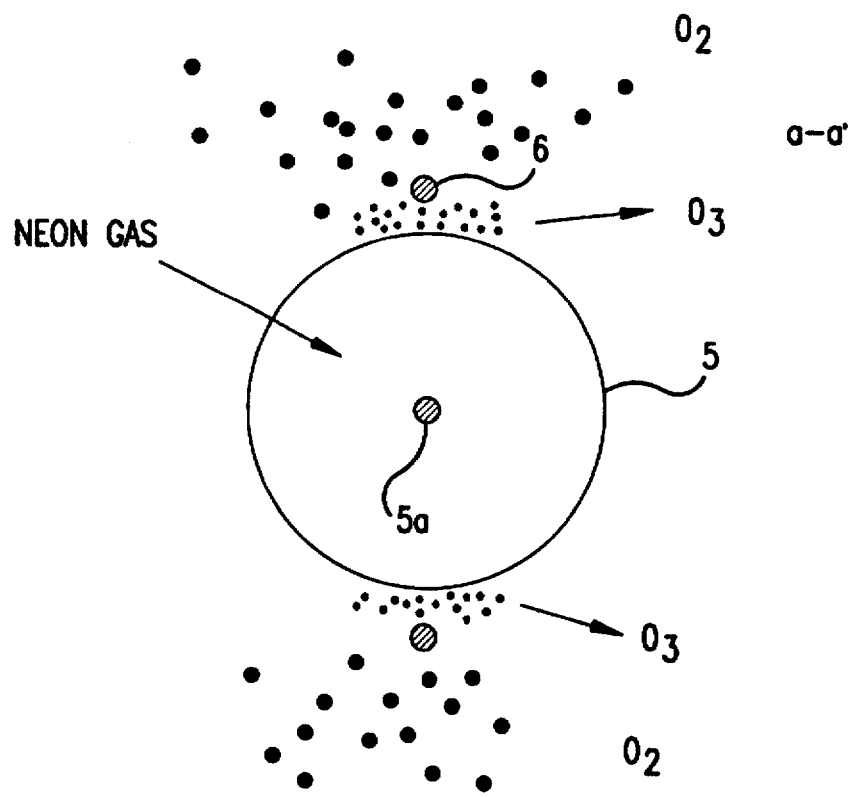
FIG. 3(b) is a cross-sectional view about a-a' line of FIG. 3(a).

FIG. 3 shows a first embodiment of an ozone generator according to the present invention. As shown in the drawing, the generator comprises a power unit 1 for supplying power, an oscillator 2 for oscillating power supplied from power unit 1, a high-voltage generator 3 for generating high voltage by boosting power supplied from power unit 1 into a predetermined level, a discharge lamp 5 for primary-discharging with the high voltage generated from high-voltage generator 3, and an metal wire 6, being installed on discharge lamp 5, which is made of glass tube for secondary-discharging utilizing as medium a glass tube or discharge gas of discharge lamp 5 to generate ozone.

The operation and effects of the first embodiment of the ozone generator of the present invention having such a structure will be described in detail now.

Primarily, power unit 1 stabilizes externally-supplied power and applies the stabilized power to oscillator 2 and high-voltage generator 3, respectively, so that oscillation and high-voltage generation are possible. Oscillator 2 oscillates with input power, and high-voltage generator 3 boosts the input power to generate a high voltage of 3 KV or more. The high voltage is applied to both ends of tungsten electrode 5a in discharge lamp 5. Discharge lamp 5 discharges power supplied to both the ends of tungsten 5a so as to light the lamp.

In this state, when a metal wire 6 is wound on the glass tube of discharge lamp 5, a secondary discharge occurs between tungsten electrode 5a and the metal wire 6 by means of the glass or the discharge gas inside of the glass tube.

When the secondary discharge occurs, oxygen $O_2$ which exists between tungsten electrode 5a and the core is separated into O+O, and the separated O being combined with $O_2$ of air generates ozone $O_3$.

By utilizing the commonly used discharge lamp as above, product cost can be reduced so that an ozone generator of low price becomes available.

However, the above method of generating ozone by injecting a luminous gas into a vacuum glass tube has a defect in that discharge is impossible when the glass tube is broken or the injection gas is consumed, which causes a limited product life. Also, the glass tube is weak in temperature, humidity and dust and to handle the core-wound glass tube is inconvenient.

Figure 4A:
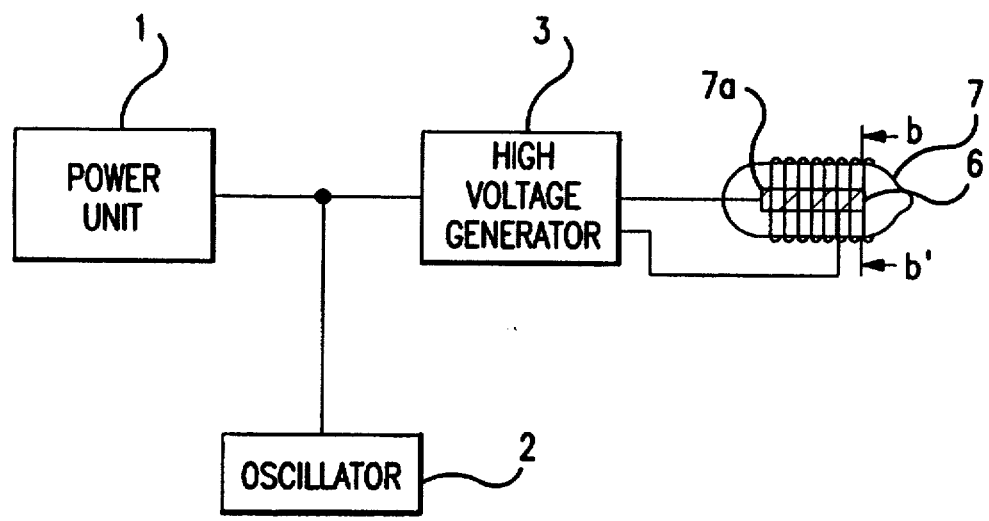
FIG. 4(a) is a schematic block diagram illustrating a second embodiment of the ozone generator of the present invention.
Figure 4B:
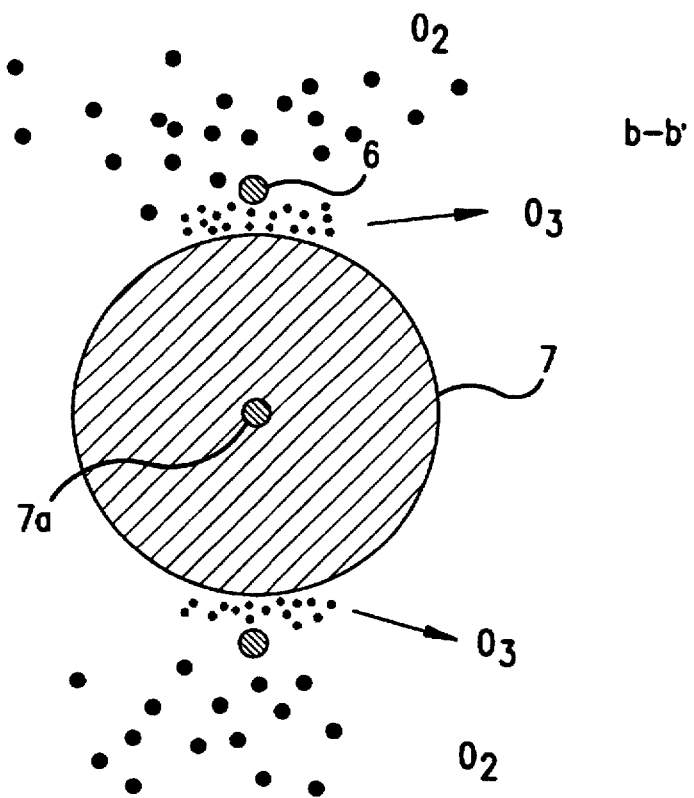
FIG 4(b) is a cross-sectional view about b-b' line of FIG. 4(a)

Thus, a second embodiment of the present invention solving the above problem is shown in FIG. 4.

FIG. 4 shows a second embodiment of the ozone generator of the present invention. The generator comprises a glass bar 7 for discharging high voltage generated in high-voltage generator 3 and a metal wire 6 for generating ozone by secondary-discharging using as a medium metal electrode 7a inside of glass bar lamp 7.

The operation and effect of the second embodiment of the present invention will be described as follows.

Primarily, power unit 1 stabilizes externally-supplied power and applies the stabilized power to oscillator 2 and high-voltage generator 3, respectively, so that oscillation and high-voltage generation are possible. Oscillator 2 oscillates with input power, and high-voltage generator 3 boosts the input power to generates a high voltage of 3 KV or more. The high voltage is applied to both ends of metal electrode 7a inside of glass bar lamp 7. Glass bar lamp 7 conducts electricity to glass bar lamp 7 by discharging with high voltage supplied to both the ends of inner metal electrode 7a.

In this state, when metal wire 6 which is wound on the glass bar lamp 7, a secondary discharge occurs between metal wire 6 and metal electrode 7a with a medium of glass bar lamp 7.

When the secondary discharge occurs, oxygen $O_2$ which exists between metal electrode 7a and the metal is separated into O+O, and the separated O being combined with $O_2$ of air generates ozone $O_3$.

Such a method of using the glass bar lamp instead of discharge lamp utilizing the glass tube has merits of being semi-permanent, having no sight effect, reducing cost and not being affected by temperature, humidity and dust, leading to easy handling.

Figure 5A:
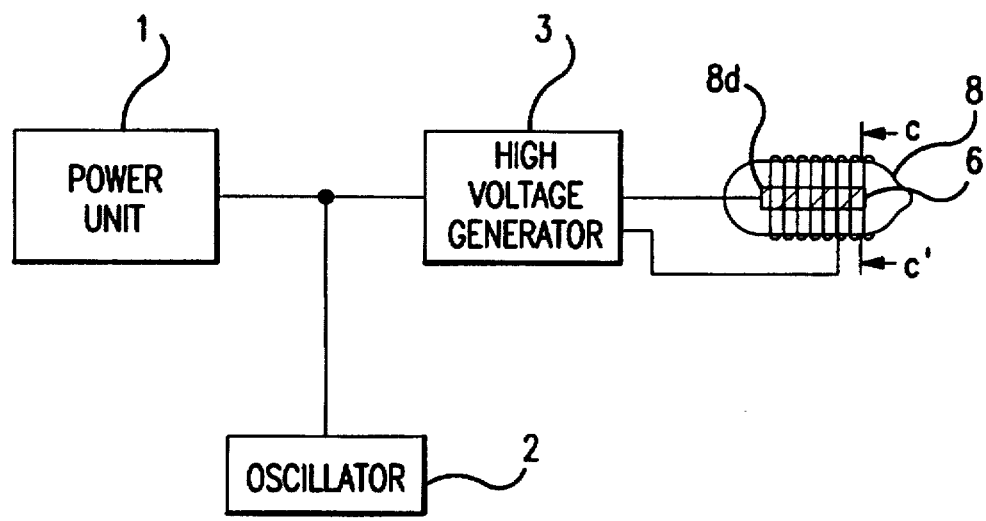
FIG. 5(a) is a schematic block diagram illustrating a third embodiment of the present invention.
Figure 5B:
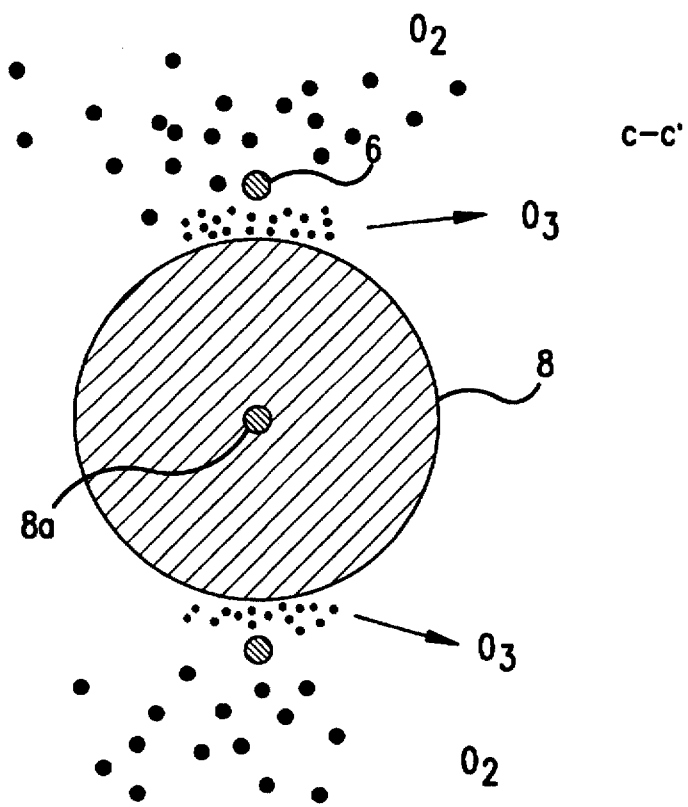
FIG.5(b) is a cross-sectional view about c-c'of FIG. 5(a).

FIG. 5 shows a third embodiment of the present invention, which utilizes a discharge ceramic stick 8 as a discharger.

As shown in the drawing, an ozone generator utilizing a discharge ceramic stick comprises a ceramic stick 8 for discharging with high voltage generate in high-voltage generator 3 and an metal wire 6 for generating ozone by secondary-discharging using as, a medium a metal electrode 8a inside of discharge ceramic stick 8.

The operation and effect of the third embodiment of the present invention will be described herebelow.

Primarily, power unit 1 stabilizes externally-supplied power and applies the stabilized power to oscillator 2 and high-voltage generator 3, respectively, so that oscillation and high-voltage generation are possible. Oscillator 2 oscillates with input power, and high-voltage generator 3 boosts the input power to generate a high voltage of 3 KV or more. The high voltage is applied to both ends of metal electrode 8a inside of discharge ceramic stick 8. Discharge ceramic stick 8 conducts electricity to discharge ceramic stick 8 by discharging with high voltage supplied to both the ends of inner metal electrode 8a.

In this state, when metal wire 6 which is wound on discharge ceramic stick 8, a secondary discharge occurs between the metal wire 6 and metal electrode 8a with a medium of discharge ceramic stick 8.

When the secondary discharge occurs, oxygen $O_2$ which exists between metal electrode 8a and the metal kinds is separated into O+O, and the separated O being combined with $O_2$ of air generates ozone $O_3$.

Such a method of using the ceramic stick instead of glass bar has merits of being semi-permanent, having no sight effect, reducing cost and not being affected by temperature, humidity and dust, leading to easy handling.

As described above, the present invention generates ozone by utilizing the glass tube of the discharge lamp, the glass bar and the ceramic stick so that ozone can be generated in a place of high temperature, humidity and much-dust. Also, the ozone can be generated at a lower cost since the glass tube, the glass bar and the ceramic stick are employed, so that product cost is reduced. Further the present invention can be applied to general electrical appliances.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. An ozone generator generating ozone by discharge generated by a high voltage supplied to a metal electrode, said ozone generator comprising a discharge lamp which primarily discharges by said high-voltage, wherein the metal electrode on both ends of which the high voltage is supplied being encased in the discharge lamps, and metal wire wound in a spaced apart relationship from the exterior of said discharge lamp, with oxygen of the air being changed to ozone by a secondary discharge which occurs between said metal electrode and said metal wire.

2. An ozone generator according to claim 1, wherein said discharge means is a glass discharge lamp.

3. An ozone generator according to claim 1, wherein said discharge means is a solid glass bar.

4. An ozone generator according to claim 1, wherein said discharge means is a solid ceramic stick.

5. An ozone generator according to claim 1, wherein material of said ozone-generating means is steel.

* * * * *